United States Patent [19]

Dunham et al.

[11] Patent Number: 5,143,305
[45] Date of Patent: Sep. 1, 1992

[54] SOIL TREATMENT APPARATUS AND METHOD

[75] Inventors: Paul V. Dunham; Russell D. Garrod, both of Soham, England

[73] Assignee: L.R.S. Limited, Soham, England

[21] Appl. No.: 713,371

[22] Filed: Jun. 13, 1991

[30] Foreign Application Priority Data

Jun. 13, 1990 [GB] United Kingdom ............... 9013229

[51] Int. Cl.$^5$ .............................................. B02C 4/08
[52] U.S. Cl. ...................................... 241/24; 209/234; 209/262; 241/101.7
[58] Field of Search ................... 241/24, 77, 81, 101.7; 209/234, 235, 262, 291

[56] References Cited

U.S. PATENT DOCUMENTS

| | | | |
|---|---|---|---|
| 32,183 | 4/1861 | Conover et al. | 209/234 |
| 2,050,458 | 8/1936 | Overstud et al. | 241/101.7 |
| 2,744,739 | 5/1956 | Evans et al. | 209/234 X |
| 3,964,719 | 6/1976 | Hally et al. | 241/101.7 |
| 4,896,835 | 1/1990 | Fahrenholz | 209/234 |

*Primary Examiner*—Douglas D. Watts
*Attorney, Agent, or Firm*—Oblon, Spivak, McClelland, Maier & Neustadt

[57] ABSTRACT

A method and apparatus for removing from soil particles within a predetermined size range, comprises a movable frame, and a digger attached thereto to excavate soil as the frame is moved. A first separater to which the excavated soil passes allows material of less than a first predetermined size to pass through and discards material of size greater than said first predetermined size. A second separater is adapted to retain material of size greater than a minimum of said predetermined size range and to discard material of size less than said minimum. The retained material is stored.

10 Claims, 4 Drawing Sheets

SOIL TREATMENT APPARATUS AND METHOD

The present invention relates to an apparatus and a method for treating soil to remove therefrom particles within a predetermined size range. The invention is particularly, but not exclusively, applicable to collection of lead shot and extraneous material from ground occupied by shooting ranges, which term includes areas used for shooting live game, artificial targets or for shooting clay pigeons. In these cases, the shot falls to the ground and over a period of some years, it will accumulate. Since lead is a poisonous heavy metal, it is desirable that it be collected and the apparatus and method of the present invention provides a means so to do.

According to a first aspect of the present invention there is provided a soil treatment apparatus for removing therefrom particles within a predetermined size range, comprising a movable frame, means attached thereto to excavate soil as the frame is moved, first separation means to which the excavated soil passes and which allow material of less than a first predetermined size to pass through and which discard material of size greater than said first predetermined size, a second separation means adapted to retain material of size greater than a minimum of said predetermined size range and to discard material of size less than said minimum, storage means for said retained material and means to transfer said retained material to said storage means.

The first separator means may comprise a rotating drum having aperture perforations of said maximum size.

The second separating means may also comprise a rotating drum having perforations of said minimum size.

The material retained by said second separating means may pass to a sump at the end of the rotating drum and thence be conveyed by an auger or similar transfer means to a crushing means.

The crushing means may act as a final separator when the particles to be removed are lead shot. In this case, the particles within the predetermined size range pass through a pair of rolls, whereby lead shot are flattened and soil particles within the same size range are made smaller, whereby only the lead shot particles are removed from the soil. A vibrating screen means may be arranged below the rolls to effect this final separation.

According to a second aspect of the present invention there is provided a method of treating soil to remove therefrom particles within a predetermined size range, said method comprising the steps of excavating a trench through the soil to be treated, passing the soil excavated to a first separation means in which particles larger than the maximum of said predetermined size range are discarded, returning said large particles to the ground in the region of the trench which has previously been excavated, passing said particles of size less than the maximum of the predetermined size range to a second separation means in which particles of size smaller than a minimum of said predetermined size range are discarded and returned to the trench and/or adjacent ground and from which particles within said size range are passed to storage means therefor, and storing said particles.

The step of passing said particles within the predetermined size range may include the step of crushing the particles, optionally between two rolls.

The particles are preferably lead shot.

An embodiment of the present invention will now be more particularly described by way of example and with reference to the accompanying drawings, in which.

Figure 1:
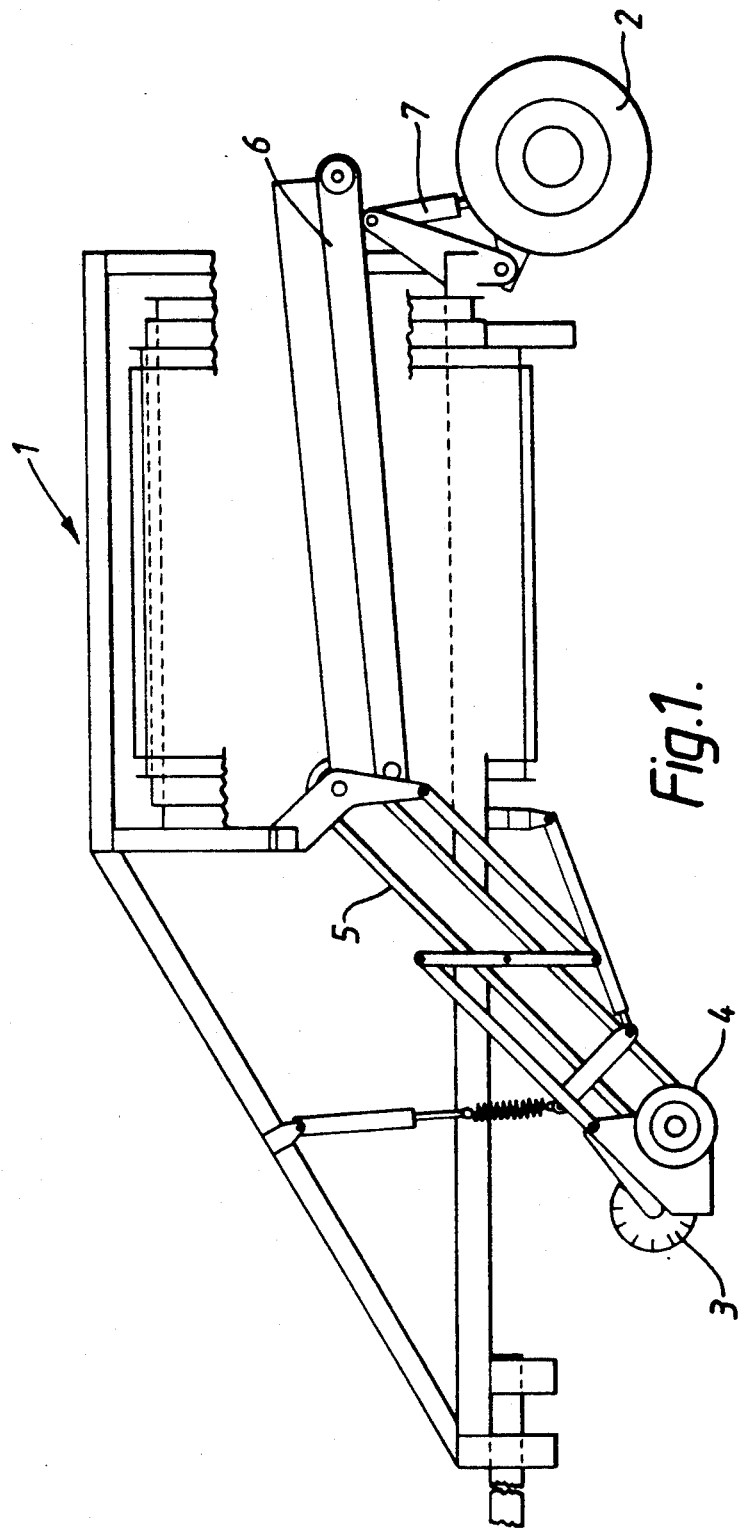
FIG. 1 is a side elevation, partially cut away, of an apparatus embodying the invention.
Figure 2:
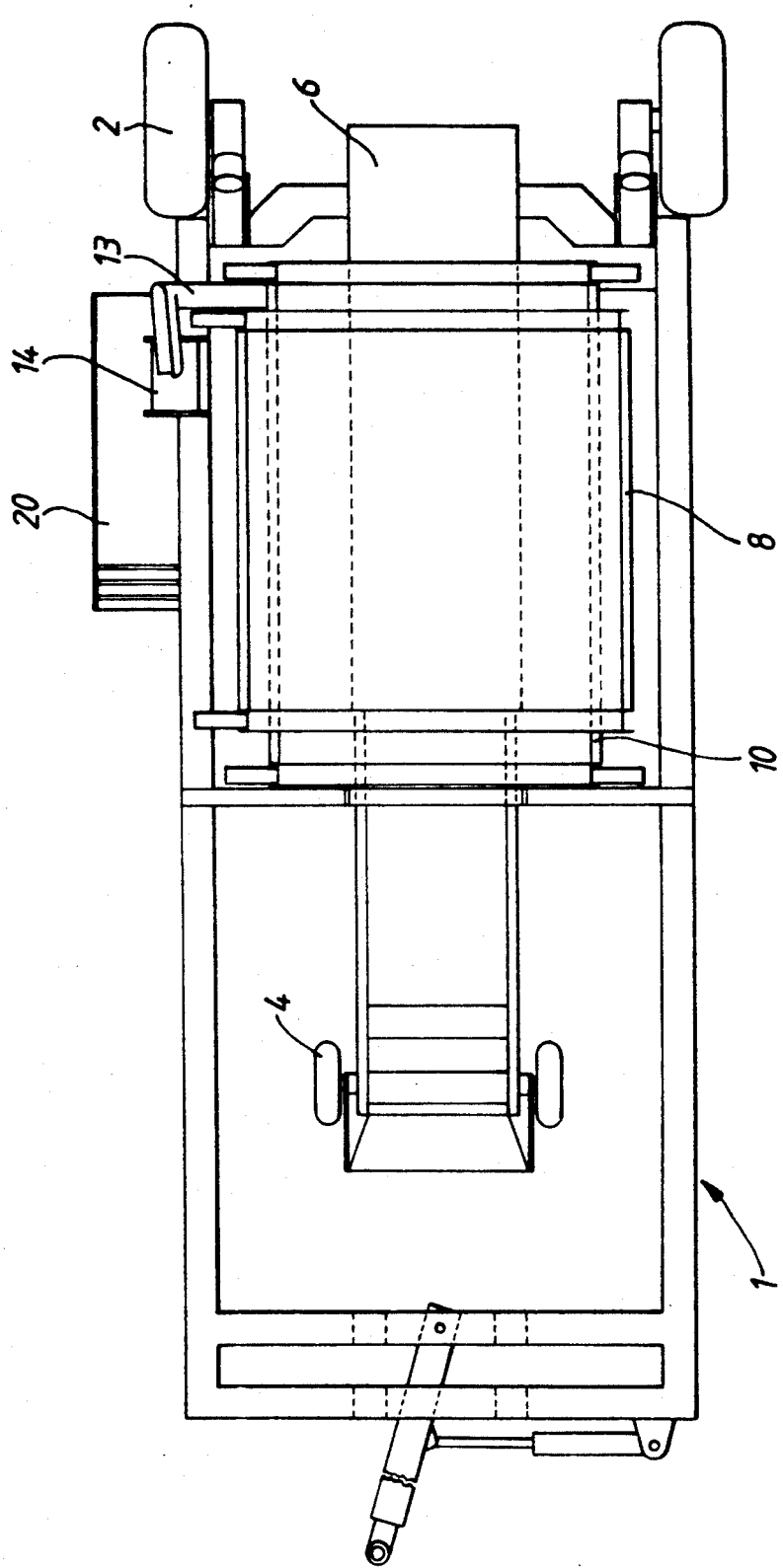
FIG. 2 is a plan view of the apparatus.
Figure 3:
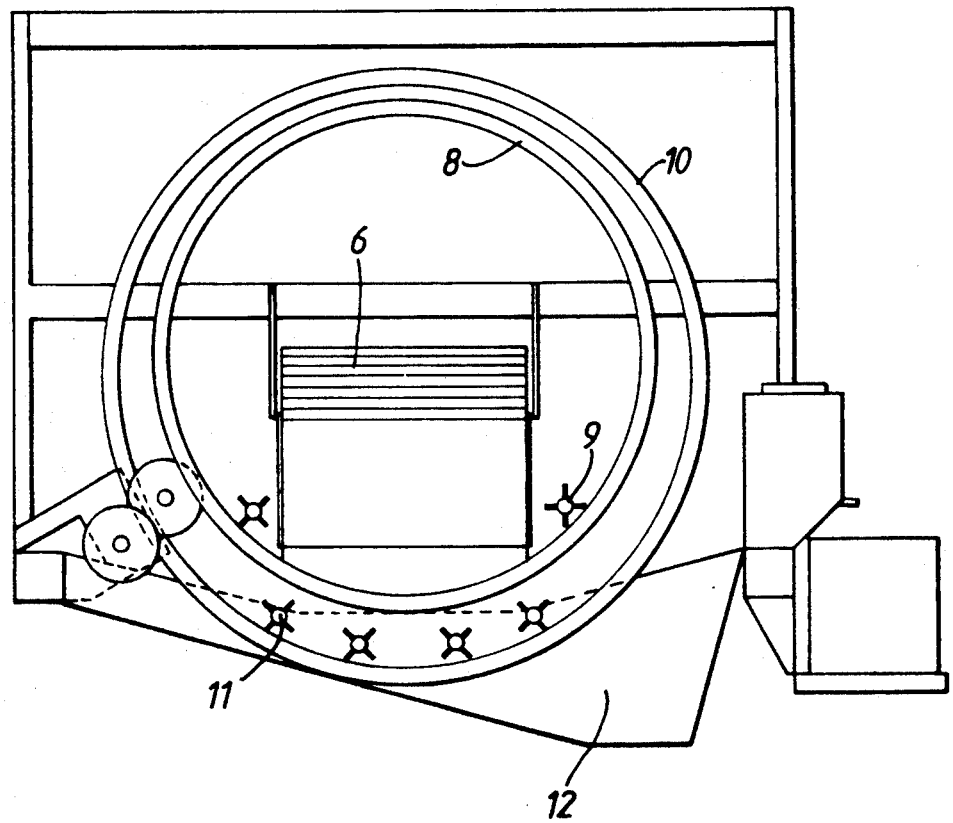
FIG. 3 is a rear end view of part of the apparatus.
Figure 4:
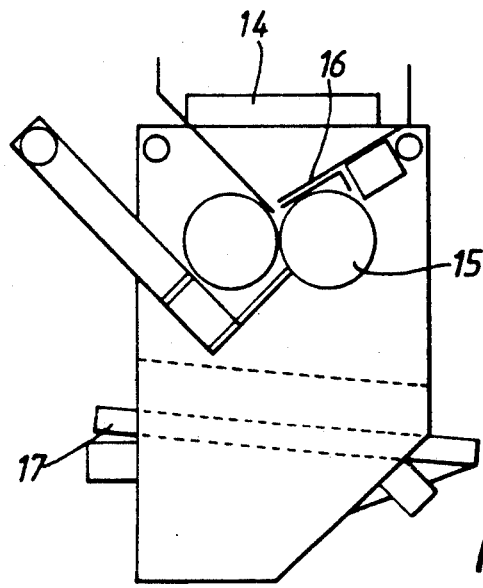
FIG. 4 is a cross-sectional view of a crusher forming part of the apparatus embodying the invention.
Figure 5:
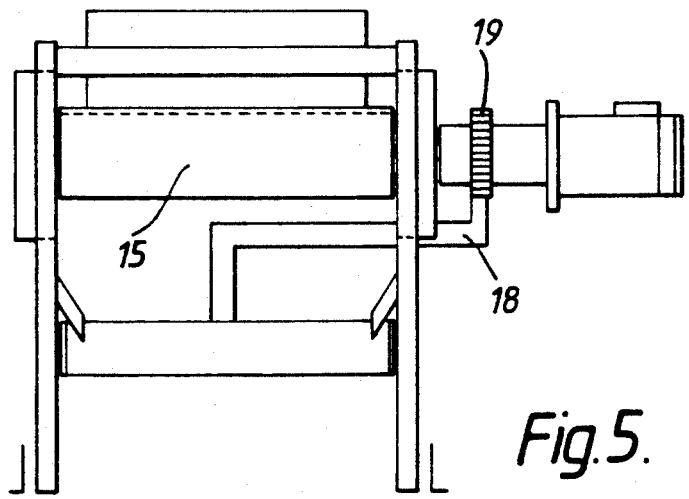
FIG. 5 is a transverse cross-section of the crusher of FIG. 4.
Figure 6:
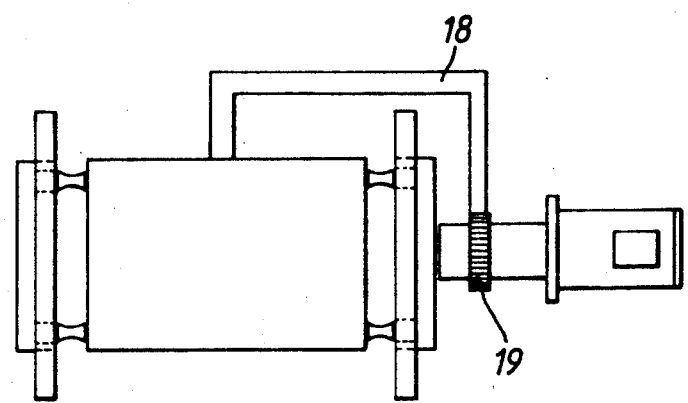
FIG. 6 is a plan view of the crusher of FIGS. 4 and 5.

The present invention will be described with reference to treatment of soil to remove lead shot therefrom. However, many other uses can be foreseen although the exact sizes of the separating means may need to be changed to accommodate different sized particles.

Lead shot comprises particles within the size range 1.6 to 3.0 mm. On ground used for a shooting range, such lead shot is widely distributed. It is, by virtue of its poisonous nature, potentially injurious to any animals which may stray across the range. Furthermore, the lead may be leached from the shot in the form of lead salts and penetrate the ground. For these reasons, it is desirable to remove the lead shot but this has not hitherto been practical since individual shot is so small that it cannot easily be picked up. It is not magnetic and therefore magnetic detection and separation means cannot be used.

The apparatus embodying the present invention comprises a frame 1 having wheels 2 and being adapted to be towed behind a propulsion means such as a tractor and powered by power take-off, hydraulics or integral motor drive. The apparatus can alternatively be self-propelled and powered. If a hydraulic system is used, there may be provided an oil cooler and priority valves. A powered scoop wheel 3 is connected to the frame 1 and excavates a trench, to a depth set by depth wheels 4. The earth so excavated passes up a conveyor belt 5 whence it is deposited on a trace conveyor 6. This consists of a series of transversely disposed bars set in pairs at 20 mm or other predetermined centers. The bars are linked by a chain and are oscillated in a substantially vertical direction by means of a cam so that finer material passes through them and large stones or pieces of clay pigeon or other extraneous material are carried along and deposited to the rear of the apparatus. The trace conveyor 6 is inclined gently upwardly at an angle which is adjustable between 0° and 10° in relation to the axis of the drums. The entire material separation system of the machine can be angled from $-10°$ to $+30°$ relative to the horizontal to optimize flow of material through the machine by adjusting hydraulic rams 7 and by adjusting the height of the drawbar in relation to ground levels.

The trace conveyor 6 may be replaced by a single series of drop bars onto which the excavated earth is dropped from the conveyor belt 5, so that the fall impact breaks up clods or clumps of earth.

The material passing through the trace conveyor 6 or drop bars falls into a circular rotatable drum 8 which comprises a skin having perforations of diameter in the region of 3.5 mm. Alternatively the surface of the drum 8 may comprises longitudinally extending bars spaced one from another by a distance in the region of 3.5 mm. The soil material is retained in a lower part of the drum by means of a pair of helically wound rotated brushes 9 bearing against an internal surface of the drum 8. The brushes 9 may be disposed either in the lower part of the drum to maintain the material in that region or they may be disposed in the upper part of the drum to allow material to roll up and tumble down, to cause break up of more obstinate matter. Material sized greater than 3.5 mm is retained by this drum and passes out at the rear and is returned to the trench. The size of the perforations can of course, be varied to suit the actual task being undertaken.

Material of a smaller size passes through the perforations into a second rotatable drum 10 surrounding the first drum 8. This second drum is provided with a perforated skin in which the perforations are 1.5 mm in size, or some predetermined size, again depending on the task. Additional helically wound brushes 11 bear on the interior surface of a lower part of this drum so that material of size smaller than 1.5 mm is forced through the perforations and falls to the ground in the area of the trench. Material of size greater than 1.5 mm, and necessarily of size less than 3.5 mm is retained by this second drum 10 and passes from its rear end to a sump 12 from which it is fed by means of auger 13 to a third drum.

Action of the drums 8,10 is primarily intended to be contra-rotating, but they may be rotated sympathetically for certain particle separation roles.

The third drum is optional, but if present, may be located alongside the drums 8,10. It has a diameter of 300 mm and length of 1200 mm and is provided with a perforated skin having apertures of 1.5 mm in diameter. This third drum is intended as a final treatment or dust separation drum. From the third drum, retained material passes to a crusher hopper 14.

A pair of contra-rotating driven rolls 15 allow material within the predetermined size range to pass from the hopper 14 between the rolls 15 under the control of a gate 16. The gap between the rolls 15 may be set to any predetermined size. Material passing between the rolls falls onto an oscillating vibrating screen 17. This may be vibrated by a lever 18, a remote end of which acts as a pawl and is acted on by a cogged wheel 19 attached to the roller drive. The rolls 15 crush any particles of clay or small stones into a size small enough to pass through the screen 17. They are then discarded into the trench. Particles of lead shot are squashed and are therefore retained on the screen 17, which is inclined so that they pass to a storage hopper 20.

The storage hopper 20 may be replaced by a number of barrels into which the shot is fed in sequence, the barrels being moved along a conveyor. Full barrels may be removed from one end and empty barrels replaced at the other end, to facilitate continuous operation.

The lead shot so reclaimed, may be melted down for reuse or sale. The ground over which the apparatus has passed is cleared of lead shot and the soil removed for the separation process is returned thereto as a mixture of large particles taken out by the trace conveyor 6, smaller particles retained by the first drum 8, and even smaller particles allowed through the second drum 10.

The device/system can be totally varied in respect of forward speed, operational speed of individual components as a whole or relative to one another to cater for general ground conditions, soil type and site conditions, and extraneous material content.

An aspiration/dust extractor system is provided at or adjacent to all discharge points, hoppers and under the final discharge screen.

If required, cameras may be installed so that an operator can view easily all aspects of the process.

We claim:

1. A soil treatment apparatus for removing therefrom particles within a predetermined size range, comprising a movable frame, means attached thereto to excavate soil as the frame is moved, first separation means to which the excavated soil passes and which allow material of less than a first predetermined size to pass through and which discard material of size greater than said first predetermined size, a second separation means adapted to retain material of size greater than a minimum of said predetermined size range and to discard material of size less than said minimum, storage means for said retained material and means to transfer said retained material to said storage means.

2. An apparatus as claimed in claim 1, wherein the first separator means comprises a rotating drum having apertures of said maximum size.

3. An apparatus as claimed in claim 1, wherein the second separating means comprises a rotating drum having perforations of said minimum size.

4. An apparatus as claimed in claim 1, further comprising a crushing means to crush material retained by said second separating means.

5. An apparatus as claimed in claim 4, wherein the crushing means comprises a pair of rolls to flatten particles.

6. An apparatus as claimed in claim 5, further comprising a vibrating screen means arranged below the rolls to effect a final separation of crushed soil from crushed particles.

7. An apparatus as claimed in claim 1, wherein the particles are lead shot.

8. A method of treating soil to remove therefrom particles within a predetermined size range, said method comprising the steps of excavating a trench through the soil to be treated, passing the soil excavated to a first separation means in which particles larger than the maximum of said predetermined size range are discarded, returning said large particles to the ground in the region of the trench which has previously been excavated, passing said particles of size less than the maximum of the predetermined size range to a second separation means in which particles of size smaller than a minimum of said predetermined size range are discarded and returned to the trench and from which particles within said size range are passed to storage means therefor, and storing said particles.

9. A method as claimed in claim 8, wherein the step of passing said particles within the predetermined size range includes the step of crushing the particles between two rolls.

10. A method as claimed in claim 9, wherein the particles are lead shot.

* * * * *